Oct. 23, 1956 R. N. MILLER 2,767,934
FISHING REEL
Filed Feb. 16, 1953 2 Sheets-Sheet 1
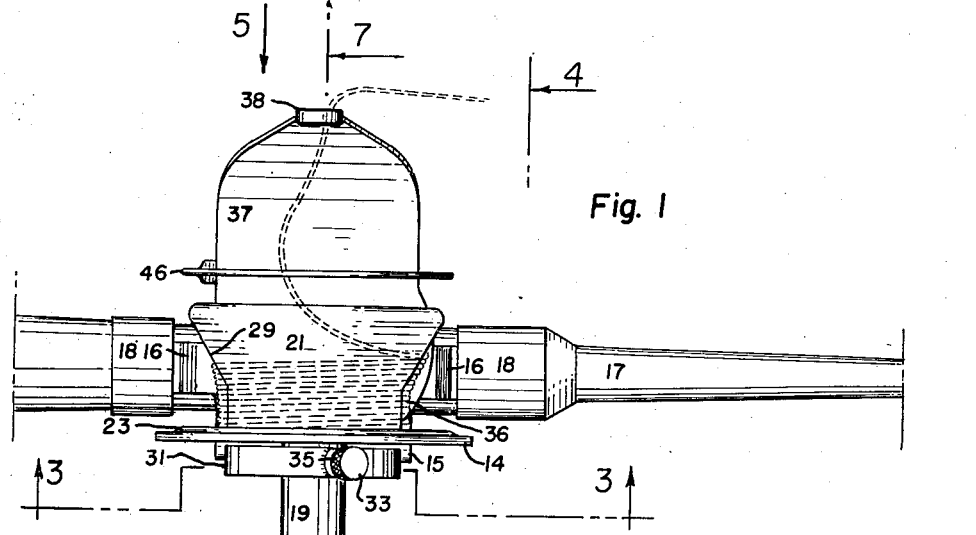
Fig. 1
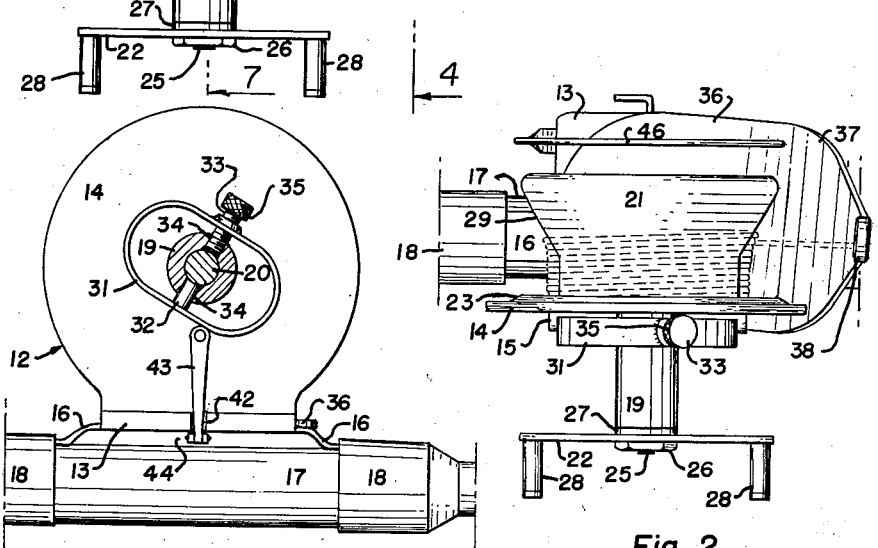
Fig. 3
Fig. 2
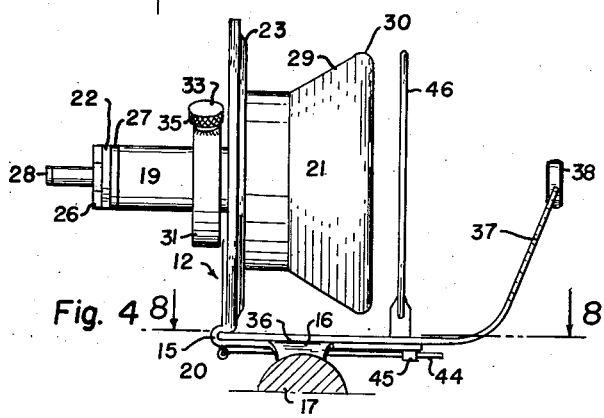
Fig. 4
INVENTOR.
Robert N. Miller
BY WHITEHEAD & VOGL
PER *Earle Whitehead*
ATTORNEYS

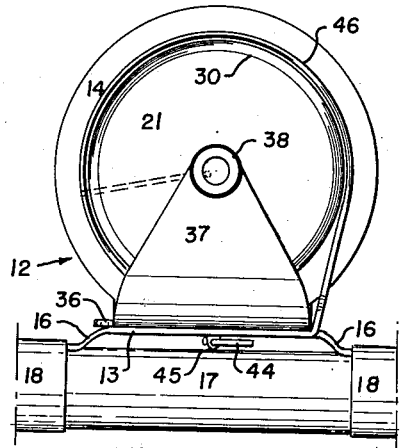

United States Patent Office 2,767,934
Patented Oct. 23, 1956

2,767,934

FISHING REEL

Robert N. Miller, Anton, Colo.

Application February 16, 1953, Serial No. 337,099

1 Claim. (Cl. 242—84.5)

This invention relates to fishing reels, and more particularly to a dual purpose fishing reel which combines the features of rotatable spool and fixed spool types of reels into a single unit, an object of the invention being to provide a new and improved fishing reel which may be mounted upon a casting rod for use either as a rotating-spool or fixed-spool reel in casting operations.

Other objects of my invention are to provide such an improved dual-purpose fishing reel which: (a) may be quickly and easily adjusted so that all movement of line onto or from the spool is effectuated and accompanied by rotation of the spool, or so that movement of the line from the spool is off an end of the spool without rotation of the spool; (b) provides simplified means for restricting the centrifugal whip of a line as it is payed off the end of the fixed spool; (c) provides an improved spool construction which permits the use of types of fishlines heretofore considered undesirable for fixed-spool types of fishing reels; (d) provides simplified means for guiding a line upon the spool during the winding operation; (e) may be thumb-braked to check line movement during a cast; (f) includes a simplified mechanical brake construction; (g) provides a straight line pull during winding of the reel with the line tension directly upon the spool; and (h) is simple in design, economical in cost and rugged and durable in use.

With the foregoing and other objects in view, all of which more fully hereinafter appear, my invention comprises certain novel constructions, combinations and arrangements of elements and parts as herein described, and as defined in the appended claim and illustrated in preferred embodiment, in the accompanying drawing, in which:

Figure 1 is a plan view of my improved fishing reel and a central portion of a casting rod upon which the reel is mounted, the reel being shown as positioned for fixed-spool casting, the fish line upon the spool and through the reel being shown in broken lines.

Figure 2 is a plan view of the reel similar to Fig. 1 but with the reel elements shifted and positioned for rotating-spool use.

Figure 3 is a sectional elevation as viewed from the indicated line 3—3 at Fig. 1.

Figure 4 is an end elevation as viewed from the indicated line 4—4 at Fig. 1.

Figure 5 is a side elevation of the reel as viewed from the indicated arrow 5 at Fig. 1.

Figure 6 is a side elevation similar to Fig. 5 but with the reel elements shifted and positioned for rotating-spool use as in Fig. 2.

Figure 7 is a transverse sectional elevation as viewed from the indicated line 7—7 at Fig. 1.

Figure 8 is a sectional plan of the reel base as viewed from the indicated line 8—8 at Fig. 4.

Figure 9 is a fragmentary portion of a reel as viewed as an end elevation similar to Fig. 4, but showing an alternate construction of line guiding elements.

Figure 10 is a fragmentary end elevation similar to Fig. 9, but showing a second alternate construction of line guiding elements.

Referring to the drawing, my improved fishing reel is built upon an L-shaped body member 12 having a substantially square base 13 and a circular side plate 14 which upstands from a longitudinal edge of the base. At the line of junction between the base and side plate the side plate is arch-folded as at 15 to provide a slot for receiving the edge of a carrier plate as hereinafter described. A rod-seating clip 16 extends from each transverse edge of the base 13 to turn below and outwardly of the base to permit the mounting and attachment of the reel upon the seat of a conventional casting rod 17, each clip extending into a conventional connector loop 18 of the rod as clearly shown in the drawing. A cylindrical bearing member 19 outstands from the center of the outer face of the plate 14 having a bearing axis congruent with the transverse central axis of the plate, there being a cylindrical passage through the bearing 19 extending through the plate 14.

The spindle elements of the reel are mounted upon this body 12 and comprise a shaft 20, which is rotatably positioned within the bearing 19, a line spool 21 axially centered upon shaft 20 at the inner face of the plate 14 and a crank 22 attached to the other end of the shaft 20 at the outer end of the bearing 19. The spool 21 includes a flat disc-like flange 23 whose outer face contacts the inner face of the plate 14 with a free sliding fit, and preferably within a circular recess 24 within the inner face of the plate 14 as seen at Fig. 7. The outer end of the shaft 20 is formed as a reduced-diameter threaded stub 25 and the crank 22 includes a threaded orifice whereby it may be turned upon the shaft stub 25 and secured into position as by a lock nut 26. A suitable spacer washer 27 may be mounted upon the shaft 20 between the crank 22 and the outer end of the bearing 19 to provide desirable clearances between the operating and fixed elements.

The crank 22 may be of any conventional design although preferably a balanced unit with the arm portions extending from each side of the shaft 20 connection and terminating as handles 28 at each end to afford balanced action when the spool is rotating rapidly. It is to be noted that the crank is directly connected to the spool shaft so that one turn of the crank effectuates a single revolution of the spool; however, it is anticipated that conventional gearing arrangements may be interposed between the shaft and crank to effectuate various ratios of revolution between the spool and the crank, and one skilled in the art can devise such gearing arrangements.

The spool 21 is cantilevered from the side plate 14 inwardly and over the base 13, with the flange 23 against the plate 14 in the recess 24. The throat diameter of the spool body adjacent the flange 23 is sufficient to permit a substantial amount of line to be wound upon the spool with each revolution thereof, and this diameter may be varied to suit the size and purpose of the reel. The overhanging end of this spool is outwardly flared as a conical surface 29 to a diameter approximating the flange 23 diameter where the edge is rounded as at 30 to permit ease of movement of a line from over the end of the spool without rotation of the spool. In the use of conventional fixed-spool reels it is to be noted that fishing lines have to be extremely stiff to pay over the flanged ends of conventional spools, while with this improved construction it is possible to use softer types of lines with good results.

Means, effective to provide mechanical braking of the reel, are mounted upon the bearing 19 alongside the outer face of the plate 14, and comprise a flattened or elliptical loop 31 of resilient material having a peg 32 and set screw 33 threaded therethrough aligned on a common diametrical span at the narrow portion of the loop. The peg and set screw are adapted to slidingly fit in diametrically opposing orifices 34 in the bearing 19 to bear against the shaft 20 as clearly shown at Fig. 3. The set screw 33 is provided with a knurled head 35 to permit the braking pressure to be applied to or released from the shaft as desired during operation of the reel in any manner desired.

The selective operation of my reel, either as a rotating-spool type or as a fixed spool type, is effectuated by shiftable line guiding means which are mounted upon a carrier plate 36, hereinbefore mentioned, which is a circular member pivotally mounted as at 39, upon the base 13. This carrier plate includes an outwardly-extending, upwardly-turned guide member 37 whose base is slightly narrower than the plate 36, the rearward edge 37a being tangential to the plate and the other edge 37b meeting the circular periphery of the plate at a point which provides a sector having an arc of approximately 210 degrees. The guide member 37 converges upwardly and terminates in a guide ring 38 whose center is aligned with the center of the spool and the rotation of the carrier plate 36 about pivot 39 permits the positioning of the guide ring 38 in alignment with the axis of the spool for paying out of the line from the spool over the rim 30 without rotation of the spool, as at Fig. 1, and also permits the positioning of the guide ring longitudinally in line with diametrical elements of the spool for winding the line onto or paying it out from the spool by rotation of the spool as at Fig. 2. It is to be noted that the 210 degree circular periphery of the plate permits movement of the guide ring 38 beyond a 90 degree arc and the guide ring is adapted to be shifted to selected positions relative to the spool 21 to regulate the piling and lay of the line upon the spool in any manner desired.

The pivot 39 should be flat headed or other type which is flush with the upper face of the carrier plate to prevent any catching of a line as it whips around the spool during a fixed-spool casting operation, as any projection or roughness on any surface which the line contacts during such operations would catch and foul the line. This pivot pin 39 extends through the base plate 13 and thence through a spring washer 40 and is locked into position by upsetting it on a rivet washer 41, all as clearly shown at Fig. 7. The purpose of the spring washer is to pull the carrier plate 36 against the base plate 13 to provide a definite frictional resistance between the two plates so that the carrier plate may be held at any selected position when the line is being wound upon the reel.

Locking means are provided to hold the carrier plate and guiding ring in a fixed transverse position for a fixed-spool casting operation. The position of the circular edge of the carrier plate 36 is within the slot formed by the arch fold 15 as hereinbefore described, and a vertical slot 42 is cut into this fold at the point of contact which is in registration with a slot 42a in the carrier plate 36 when the carrier plate is positioned transversely. A spring bar 43 is pin connected to the outer face of the side plate 14 and depends through the slot 42 and into the slot 43 to lock the carrier plate in position as clearly indicated at Fig. 8. A finger bar 44 pivotally connected to the lower end of the spring bar 43 and slidingly mounted underneath the base plate 13, as in a guide 45, extends beyond the base plate 13, and its end is formed in any suitable manner to permit easy finger pressure thereon to push the spring 43 out of the slot 42a and unlock plate 36 for rotation.

In a fixed-spool casting operation, the movement of the line over rim 30 at the end of the spool is accompanied by a centrifugal action which tends to form a spinning loop in the line as it moves outwardly from the spool. This line loop must be restricted in size or it will catch upon some projection and foul the cast. As aforesaid, the surfaces and edges of the cover plate and guide member must be absolutely smooth and without projections thereon. This alone is insufficient so a circular fender loop 46 is provided in a plane parallel to the plane of edge 30 and, for ordinary types of fishing lines, spaced about one half inch therefrom, having a diameter slightly greater than that of edge 30. One end of this fender loop 46 is mounted on the rear edge of base plate 13 and the loop extends therefrom to point 46a which is approximately 30 degrees forwardly of the bottom center point. This point of termination is such that the line will drop out of the loop whenever the carrier plate is shifted for spool winding operations, as indicated by the broken lines at Fig. 6. It follows that the threading into and dropping from this fender loop is in essence an automatic operation, for whenever a casting operation commences, the first movement of the line is to pass under the end 46a of the fender loop and into the loop at its rear side and thence continue to circle the inside of the loop while paying out of the line continues.

The alternate constructions at Figs. 9 and 10 vary in that the carrier plate 36 omits the guiding member 37, but has the fender element clip mounted upon plate 36 instead of the base plate 13, and this fender element is so constructed as to carry the line guide ring 38 in its proper central position. In the construction at Fig. 9, the fender element comprises a circular bar 46b positioned as aforedescribed, but continued as a conical coil 47 with the guide ring 38 at the apex point. In the construction at Fig. 10, the circular fender is formed as the base of a circular cone 49 which is positioned upon the carrier plate 36 by a clip 50 which holds the cone with the axis horizontal so that the line guide ring 38 may be properly located at the apex point aligned with the spool axis.

As aforedscribed, the operation of my improved fishing reel is by shifting the guiding member forwardly for winding operations where the spool is rotated, and by shifting it laterally for fixed spool casting operations. It is to be noted that the spool is so positioned, when the reel is mounted upon a casting rod, that thumb braking of the cast is possible, either when used as a rotating spool type reel or as a fixed spool type reel for it is but a simple matter for a fisherman to place his thumb over the body of the spool to check its rotation or the movement of line therefrom.

While I have described and illustrated many details of construction, it is apparent that others skilled in the art can devise alternate and equivalent constructions which are within the scope and spirit of my invention, hence, it is my desire that my protection be limited only by the proper scope of the appended claim.

I claim:

A fishing reel assembly comprising an L-shaped body including a base plate and a side plate, means for attaching the body to a fishing rod, a bearing extending outwardly from the outer face of said side plate, a shaft in said bearing, a spool mounted upon one end of the shaft with one end cantilevered from the side plate over the base plate, means for rotating said shaft and thereby said spool, a carrier plate rotatably mounted upon said base plate and having a guiding member, a line guide carried by said guiding member at the level of the shaft and spool axis, said line guide being positionable, responsive to rotation of said carrier plate, selectively, in alignment with the shaft and spool axis and in alignment with diametrical elements of the spool, the cantilevered end of said spool having an enlarged rim, and a circular fender bar upstanding from the base plate alongside and in spaced parallelism with said rim, and having a diameter at least substantially as large as the spool rim diameter and having an open portion at the underside adjacent the carrier plate whereby to thread on and cast off a fishing line during casting and winding operations.

(References on following page)

References Cited in the file of this patent

UNITED STATES PATENTS

| | | |
|---|---|---|
| 2,034,917 | Miller | Mar. 24, 1936 |
| 2,035,279 | Shakespeare | Mar. 24, 1936 |
| 2,283,773 | Teitsma | May 19, 1942 |
| 2,512,170 | Oen | June 20, 1950 |
| 2,569,770 | McFate | Oct. 2, 1951 |
| 2,613,046 | Redding | Oct. 7, 1952 |
| 2,689,691 | Peter | Sept. 21, 1954 |

FOREIGN PATENTS

| | | |
|---|---|---|
| 8,517 | Great Britain | of 1910 |
| 813,087 | France | Feb. 15, 1937 |
| 987,475 | France | Apr. 18, 1951 |